US008804770B2

(12) United States Patent
Osborne

(10) Patent No.: US 8,804,770 B2
(45) Date of Patent: *Aug. 12, 2014

(54) COMMUNICATIONS SYSTEM AND RELATED METHOD FOR REDUCING CONTINUITY CHECK MESSAGE (CCM) BURSTS IN CONNECTIVITY FAULT MANAGEMENT (CFM) MAINTENANCE ASSOCIATION (MA)

(71) Applicant: ADTRAN, Inc., Huntsville, AL (US)

(72) Inventor: Sean M. Osborne, Minneapolis, MN (US)

(73) Assignee: Adtran Inc., Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/783,640

(22) Filed: Mar. 4, 2013

(65) Prior Publication Data

US 2013/0182723 A1 Jul. 18, 2013

Related U.S. Application Data

(63) Continuation of application No. 12/904,200, filed on Oct. 14, 2010, now Pat. No. 8,391,319.

(51) Int. Cl.
*H04J 3/06* (2006.01)
(52) U.S. Cl.
USPC ........................................................ 370/503
(58) Field of Classification Search
USPC .............. 370/229–235, 236.1, 241–254, 389, 370/390, 509, 510
See application file for complete search history.

(56) References Cited

U.S. PATENT DOCUMENTS

| 7,684,332 | B2 | 3/2010 | Ray et al. |
| 7,948,909 | B2 | 5/2011 | Bugenhagen et al. |
| 8,018,972 | B2 * | 9/2011 | Roberts et al. ................ 370/507 |
| 8,027,258 | B2 | 9/2011 | Mizutani et al. |
| 2008/0005156 | A1 | 1/2008 | Edwards et al. |
| 2008/0049629 | A1 | 2/2008 | Morrill |
| 2008/0049631 | A1 | 2/2008 | Morrill |
| 2009/0279441 | A1 | 11/2009 | Wong et al. |
| 2010/0329125 | A1 | 12/2010 | Roberts et al. |

FOREIGN PATENT DOCUMENTS

EP 1770903 4/2007

OTHER PUBLICATIONS

ITU-T, OAM functions and mechanisms for Ethernet based network, ITU-T Recommendation Y.1731, 80 pages, 2006.*
"Configuration Ethernet OAM, CFM, and E-LMI", Cisco ME 3400E Ethernet Access Switch Software Configuration Guide Cisco IOS Release 12.2(52) SE, Chapter 43, 56 pages.
Mohan et al., L2VPN OAM requirements and Framework, Internet—Draft, 37 pages, Jan. 2009.

* cited by examiner

*Primary Examiner* — Frank Duong
(74) *Attorney, Agent, or Firm* — Fish & Richardson P.C.

(57) ABSTRACT

In accordance with a non-limiting example, a system and method minimizes collisions between transmitted connectivity fault management (CFM) packets. Maintenance association endpoints are formed from a plurality of network switch elements to form a maintenance association. The clocks between each network switch element within the maintenance association are synchronized. A unique transmission window is assigned to each maintenance association endpoint as part of the maintenance association. A respective CFM packet is transmitted as a continuity check message (CCM) within the unique transmission window.

23 Claims, 10 Drawing Sheets

PEER MEPS Rx MEP 1'S CCM

ALL CCM TRAFFIC IN MA

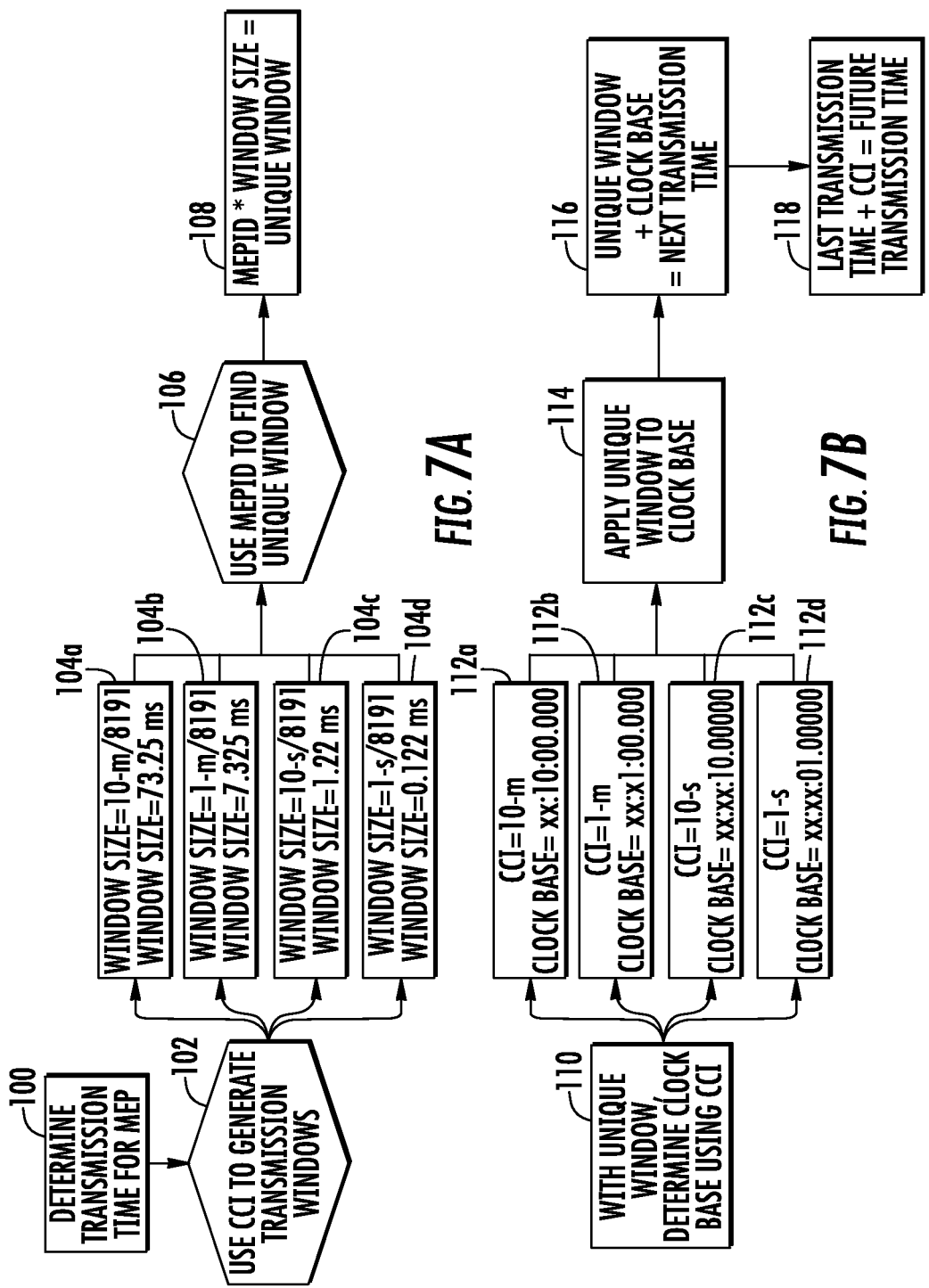

COMMUNICATIONS SYSTEM AND RELATED METHOD FOR REDUCING CONTINUITY CHECK MESSAGE (CCM) BURSTS IN CONNECTIVITY FAULT MANAGEMENT (CFM) MAINTENANCE ASSOCIATION (MA)

CROSS-REFERENCE TO RELATED APPLICATION

This application is a continuation of U.S. patent application Ser. No. 12/904,200 entitled "Communications System And Related Method For Reducing Continuity Check Message (CCM) Bursts In Connectivity Fault Management (CFM) Maintenance Association (MA)" filed on Oct. 14, 2010, the entire contents of which is hereby incorporated by reference for all purposes.

FIELD OF THE INVENTION

The present invention relates to communications systems and networks, and more particularly, to techniques for reducing continuity check message bursts in connectivity fault management maintenance associations.

BACKGROUND OF THE INVENTION

As defined by IEEE 802.1ag (Ethernet Connectivity Fault Management), Maintenance Association End Points (MEP's) are created on various switch elements across a network to create a Maintenance Association (MA). Periodically each MEP sends a Connectivity Fault Management (CFM) packet as a multicast Continuity Check Message (CCM) to inform other MEP's in the MA that the link between the two is still operational. The interval of the CCM transmission typically should be about the same for all MEP's in the MA. The intervals allowed by the standard are 3.3 ms, 10 ms, 100 ms, 1-s, 10-s, 1-m and 10-m. This design is implemented under the assumption that increasing the interval will allow a local MEP to handle more peers as the reception of CCM's will be at the same or lower rate if the number of peers is increased and the interval increased. For example, if the MA expands from 100 MEP's to 1000 MEP's, but the load on the network and the load on the CCM reception is required to stay the same, the operator could increase the CCM interval from 1-s to 10-s.

Increasing the interval, however, can be problematic. There is no system design in place to prevent these 1000 MEP's from transmitting all their CCM's at the same time. As a result, a MEP could receive a burst of 1000 CCM's. It is unlikely that its queue will be able to hold all the CCM's. This leads to the majority of them being dropped. In an alternative approach to solve this problem, the CCM interval could be increased to one minute, but the same burst problem could exist. Also, there are a number of factors that increase the likelihood of MEP's in a MA dropping the packets. For example, as the CFM service is initially provisioned across the network, it is enabled at the same time on all devices to prevent false alarms during the MA configuration. Another factor is when a MEP detects a fault in an MA, it expedites a CCM and restarts its transmission timer. Certain faults in a MA will be detected by all MEP's at the same time, leading them to expedite a CCM and restart their transmission timers in synchronization.

SUMMARY OF THE INVENTION

In accordance with a non-limiting example, a system and method minimizes collisions between transmitted connectivity fault management (CFM) packets. Maintenance association endpoints are created from a plurality of network switch elements to form a maintenance association. The clocks between each network switch element within the maintenance association are synchronized. A unique transmission window is assigned to each maintenance association endpoint as part of the maintenance association. A respective CFM packet is transmitted as a Continuity Check Message (CCM) within this unique transmission window.

In one example, the clocks are synchronized using a network time protocol. In another example, a transmission window is determined by dividing the CFM packet interval by the maximum number of maintenance association endpoints in the maintenance association. In yet another example, a transmission window is determined by ordering the maintenance association endpoints and determining which transmission window to use based on the ordering of the maintenance association endpoints.

In one example, a communications system includes a plurality of network switch elements that each comprise a transceiver and clock and each configured as a maintenance association endpoint (MEP) and arranged to form a maintenance association. Each MEP is configured to send periodically a connectivity fault management (CFM) packet as a multicast continuity check message (CCM). A clock of each network switch element within the maintenance association is synchronized with other respective clocks and each MEP is assigned a unique transmission window in the maintenance association to transmit from a MEP a respective CFM packet as a CCM.

In one example, each clock is synchronized using a network time protocol. A respective MEP is configured to determine a transmission window by dividing the CFM packet interval by the maximum number of MEP's in a maintenance association. A MEP is also configured in one example to have a unique transmission window at which it is the only MEP in the maintenance association transmitting a CCM.

In another example, a MEP is configured to use an identifier as an index to a list of transmission windows and use the transmission window as an offset against a synchronized timing source. The MEP can be configured to apply an offset against a base timing value of clock.

BRIEF DESCRIPTION OF THE DRAWINGS

Other objects, features and advantages of the present invention will become apparent from the detailed description of the invention which follows, when considered in light of the accompanying drawings in which:

FIGS. 7A and 7B are flowcharts describing a fixed method for determining a transmission window for a MEP in accordance with a non-limiting example.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Ethernet interfaces on various routers support the IEEE 802.1 AG standard for Operation, Administration and Management (OAM) and provide for Ethernet Connectivity Fault Management (CFM) and monitor an Ethernet communications network that typically includes one or more service instances. Different network entities such as operators, providers and customers are typically part of different administrative domains and each can be mapped into one maintenance domain and configured with different level values to keep them separate. Usually each administrative domain provides enough information for the entities to perform their own management, perform end-to-end monitoring, and avoid security breaches.

Figure 1:
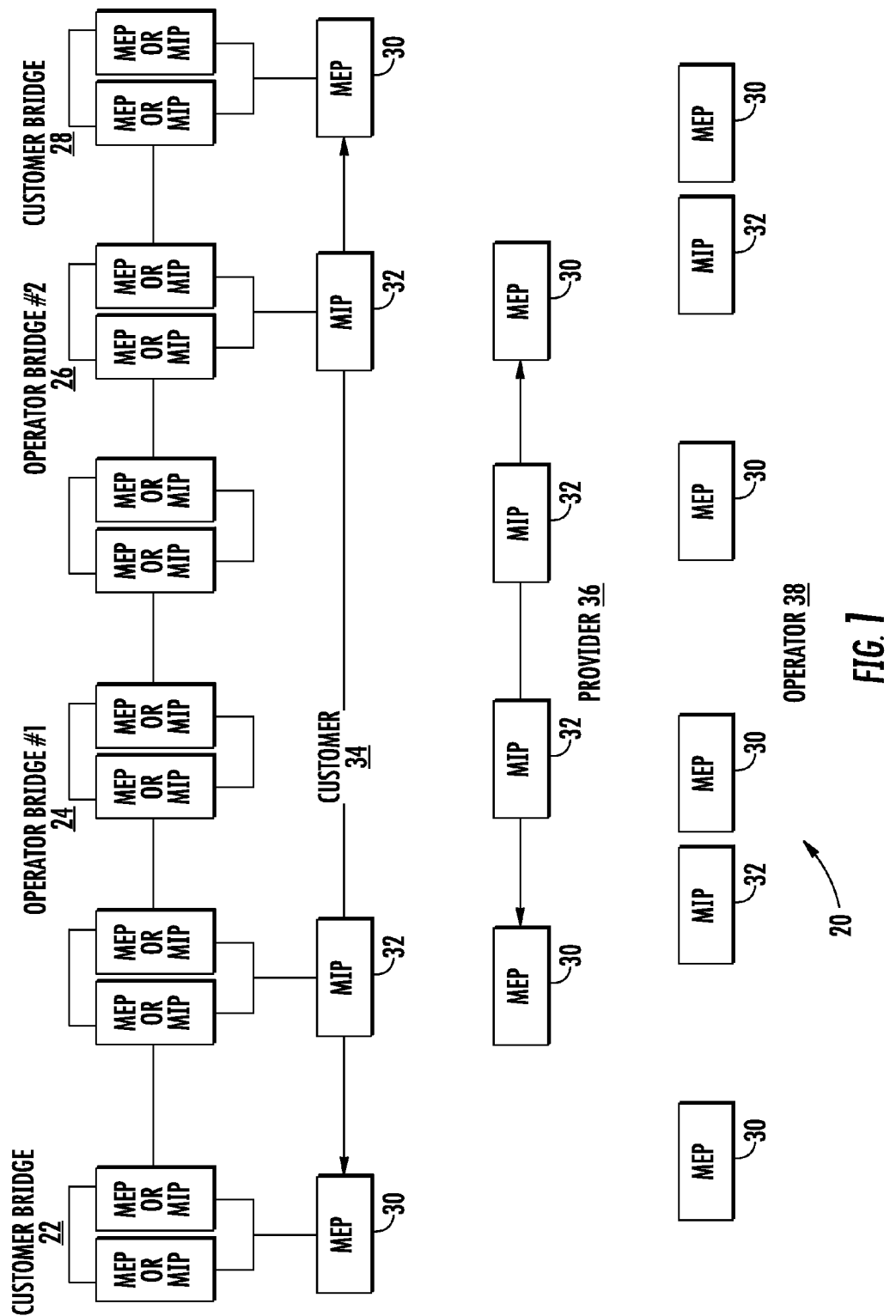
FIG. 1 is a network diagram of a communications system showing an example relationship between a customer, provider, operator Ethernet bridges, a maintenance domain, maintenance association endpoints (MEPs) and Maintenance Intermediate Points (MIPs).

FIG. 1 is an example of a communications system 20 as a network view and showing various communications network bridges such as a customer bridge 22, operator 1 bridge 24, operator 2 bridge 26, and a customer bridge 28, each formed from maintenance association endpoints (MEP's) or maintenance association intermediate points (MIP's) 32 and showing the customer level 34, provider level 36 and operator level 38. It should be understood that a maintenance association is a set of maintenance endpoints that are configured with a maintenance association identifier (MEPID) and maintenance domain level.

Figure 2:
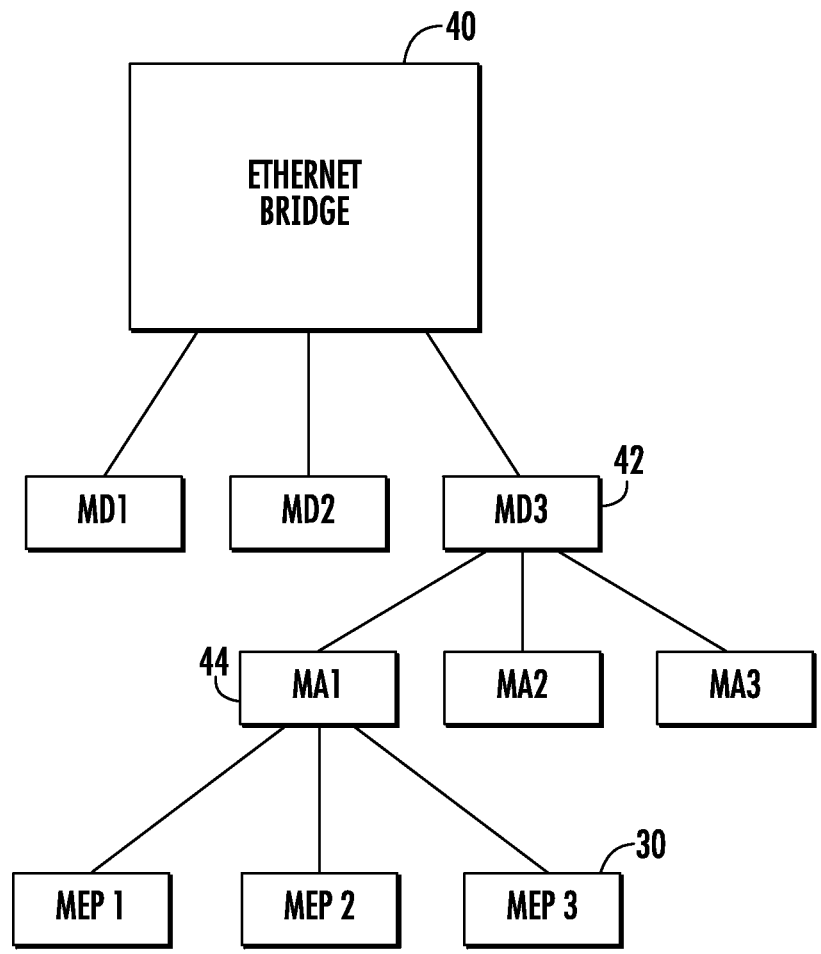
FIG. 2 is a network diagram of a communications system showing a hierarchical relationship between an Ethernet bridge, a maintenance domain, maintenance association, and maintenance endpoints.

FIG. 2 is another view of the communications system 20 showing example of a network and showing the hierarchical relationship between an Ethernet bridge 40, maintenance domains 42, maintenance associations 44 and maintenance association endpoints 30. The Continuity Check Protocol (CCP) is typically used for fault detection by a maintenance association endpoint within a maintenance association. Each maintenance association endpoint typically sends a multicast continuity check messages (CCM's) and the receiving maintenance association endpoints use the continuity check messages to build a maintenance association endpoint database of all the maintenance association endpoints in the maintenance association.

Figure 3:
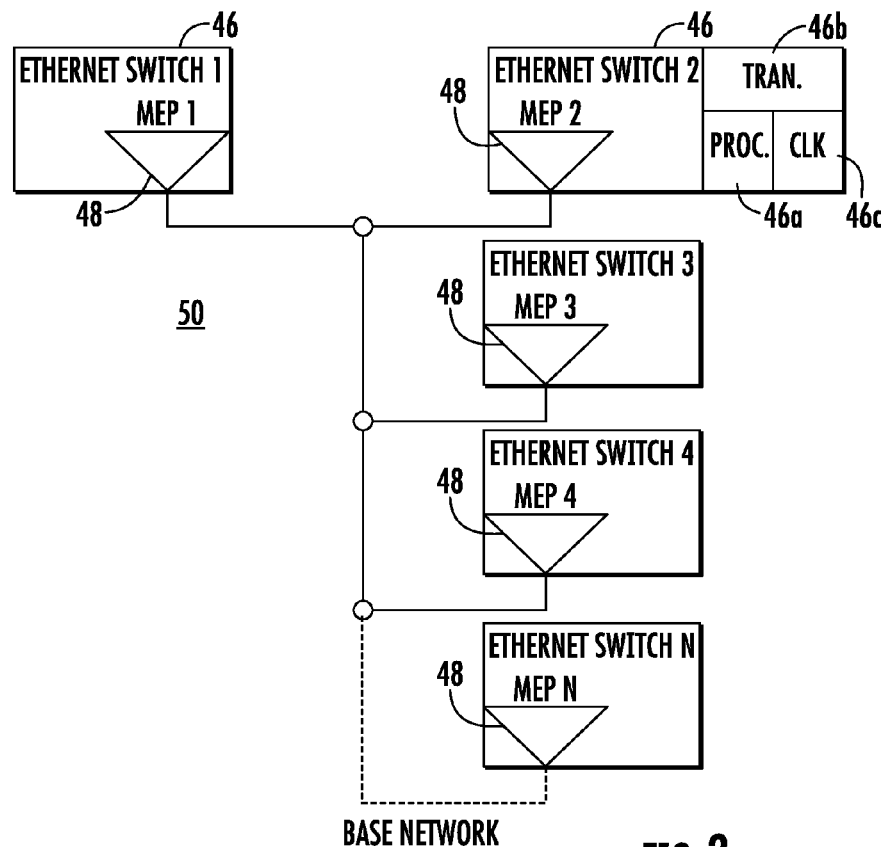
FIG. 3 is a network diagram of a maintenance association having one through "n" network devices as Ethernet switches.

FIG. 3 is a simplified network diagram of a network of Ethernet switches 46 each having a processor 46a, transceiver 46b and clock 46c and forming a maintenance association 50 network having 1 through n network devices as the Ethernet switches in this non-limiting example. Only one switch is illustrated with the processor, transceiver and clock. Each switch also includes other components (e.g., queues) as known to those skilled in the art. Each device has a Maintenance Association End Point (MEP) 40 assigned to it and each MEP is uniquely identified by a Maintenance Association End Point Identifier (MEPID). According to the IEEE 802.1ag standard, the valid range for MEPID's is 1-8191 and an ID is typically only used by a single MEP 46 within a Maintenance Association (MA) 50. The network connection is a shared resource between the five network devices as shown and it is assumed to use the Ethernet protocol for frame transmission, reception, and managing congestion.

Figure 4:
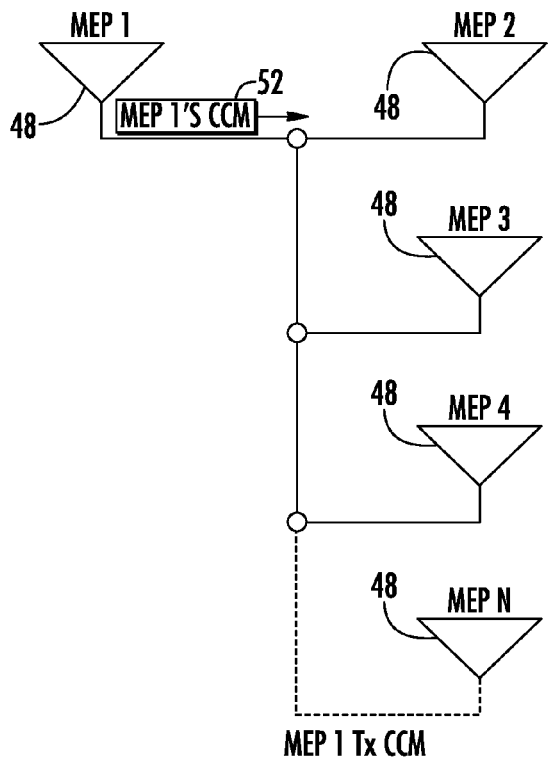
FIG. 4 is another network diagram of a maintenance association showing a maintenance association endpoint (MEP) transmitting a Connectivity Fault Management (CFM) packet as a continuity check message (CCM).
Figure 5:
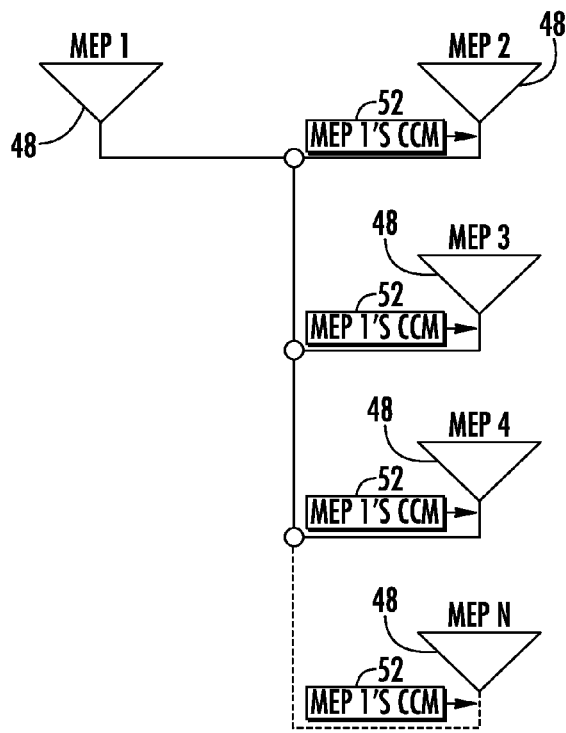
FIG. 5 is another network diagram showing a copy of that same CCM reaching each peer in the maintenance association.

As part of the 802.1ag standard, each MEP 48 in the MA 50 will transmit multicast a CFM packet as Continuity Check Message (CCM) at a configurable rate. Since the CCM is a multicast frame, a MEP transmits a single CCM and it will be replicated by any intermediate layer 2 network device and reach every peer in the network. FIG. 4 shows MEP 1 transmitting a CFM packet 52 as a CCM. FIG. 5 shows a copy of that same CCM packet 52 reaching each peer in the MA, up to MEP N. In one example, the CCM packet 52 is a one-way message. Typically, no response is expected from network devices, e.g., the Ethernet switches as MA's 50 receiving the CCM packet. In this example, it is used as a technique for the MEP 1 to communicate to its peers that are still part of the MA. MEP 1 will retransmit its CCM at a given CCM Interval (CCI). That same interval is typically used by all MEP's across the MA and the 802.1ag standard values as noted before are 3.3 ms, 10 ms, 100 ms, 1 s, 10s, 1 m, and 10 m.

Figure 6:
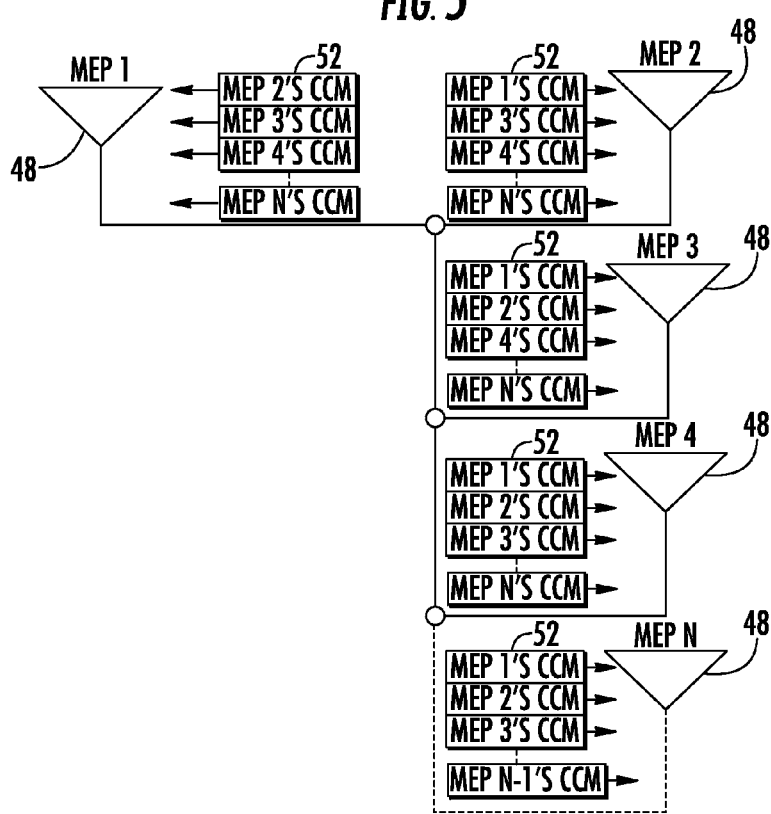
FIG. 6 is a more detailed network diagram showing the CFM traffic generated by all maintenance association endpoints in the maintenance association.

FIG. 6 shows a more detailed network view and showing the CFM traffic generated by all MEP's 48 in the MA 50. MEP 1 is expected to receive CCM's from MEP's 2 through n every CCI. Likewise, every other MEP in the MA is expected to receive a CCM from all peers every CCI. The failure to receive a CCM from a given peer in 3.5 * CCI results in the MEP issuing a Fault Alarm, indicating that there has been a disconnection in the service between it and the peer.

As described above, MEP 1 is expected to receive CCM's from MEP's 2 through n every CCI. If there are 100 MEP's in the MA and the CCI is 10-seconds, MEP 1 is expected to receive 99 CCM's every 10 seconds. Since a MEP's transmission of a CCM is independent of its peers, there is no way to predict or define the CCM reception distribution realized by MEP 1. If the link connecting all MEP's is operating at 1 Gbit/s, each MEP's CCM is 100 bytes, and the minimum interframe gap is 96 ns. As a result, the minimum amount of time for 99 CCM's to be received by a single MEP is:

frames (IDF+CCM Tx Time at line rate) 99 (96 ns+745 ns)=83 us

In this worst burst case example, if all MEP's 2 through 100 are transmitting their CCM's are the nearly same time, then all 99 CCM's may reach MEP 1 within an 83 us interval. CCM reception requires more processing than normal data traffic and a device may set guidelines for recommended CCM reception loads such that CCM's are not dropped by queues in the switch while they are waiting to be processed, or dropped by software if they cannot be stored in memory or processed quickly enough to be copied.

One technique uses a maximum number of peer MEP's that can be supported by a device and a minimum rate at which they should transmit CCM's. An example of such a rating would be—"A device can process 10 CCMs/s." With this rating it seems logical to allow any of the following MA configurations:

a) 600 MEP's with 1-minute CCI;
b) 100 MEP's with 10-second CCI; and
c) 10 MEP's with 1-second CCI.

If across the MA 50 the MEP CCM transmission times are uniformly distributed, the CCM reception would appear to be 10 CCM/s at a given MEP with a delay of 0.1 seconds between each reception. However, there is nothing in the 802.1ag standard tying the MEPs' transmission times together to ensure this uniform distribution. The extreme case shown previously usually cannot be prevented, and thus, deploying a device with a rated peer MEP count and rated CCI cannot be guaranteed to always work. In order to guarantee that the MEP CCM transmission times are unique and thus cooperate with each other to reduce bursting and CCM frame drops, two approaches are possible in accordance with non-limiting examples as fixed and adaptive solutions.

It should be understood that it is possible to synchronize clocks for the MEP's within a microsecond of accuracy across the network. A local MEP is assigned a unique transmission window at which it is the only MEP in that MA transmitting a CCM. Network Time Protocol (NTP) is an example solution for clock synchronization. Other precision time protocols can be used, including IEEE 1588v2. In accordance with one example, NTP synchronizes the clocks of computer systems over packet-switched, variable-latency data networks. Typically, NTP uses the UDP (User Datagram Protocol) on port 123 as its transport layer. It can resist the effects of variable latency by using a jitter buffer in one example. NTP typically provides a coordinated universal time (UTC). NTP details are specified in RFC 778, RFC 891, RFC 956, and RFC 135, the disclosures which are hereby incorporated by reference in their entirety. NTP in an example uses a hierarchical, semi-layered system of levels of clock sources in which each level is a stratum and assigned a layer number starting with 0 at the top. This stratum level defines its distance from the reference clock and prevents cyclical dependencies in the hierarchy. NTP stamps are typically 64-bit time stamps that include a 32-bit second part and a 32-bit fractional second part giving NTP a time scale of $2^{32}$ seconds as 136 years and a theoretical resolution of $2^{-32}$ seconds or about 233 picoseconds.

In accordance with non-limiting examples, there are two techniques for determining the transmission window, i.e., 1) fixed and 2) adaptive.

The transmission windows in one non-limiting example are determined by dividing the CCI by the maximum number of MEP's possible in a MA (8191). This creates 8191 transmissions windows. The local MEP uses its MEPID as an index to the list of transmission windows. The time to transmit a CCM is then found by using the transmission window as an offset against the synchronized timing source. The offset is applied against a base timing value of the common clock. The "base" value differs with different CCI's. It can be the beginning of a second, a second that is a multiple of 10, a minute, or a minute that is a multiple of 10. The flowcharts describing this general fixed method is shown in FIGS. 7A and 7B.

FIG. 7A shows the flowchart to determine the transmission time for the MEP (block 100). The CCI is used to generate transmission windows (block 102) and four transmission windows sizes are illustrated at respective blocks 104*a* through 104*d*. The MEPID is used to find the unique window (block 106) corresponding to the MEPID times the window size for the unique window as illustrated at block 108. This unique window is used to determine a clock base or base timing value of a common clock using the CCI (block 110) illustrating four CCI's with the clock base at blocks 112*a* through 112*d*. The unique window is applied to the clock base (block 114) and the next transmission time is obtained using the unique window and clock base (block 116). The future transmission time is determined using the last transmission time plus the CCI (block 118).

Fixed Example 1: The MEPID is 100 and the CCM interval is 1-second. The MEP should transmit its CCM's at an offset of 0.012 s of every second. The flowcharts illustrating this example are shown in the flowcharts of FIGS. 8A and 8B.

Figure 8A:
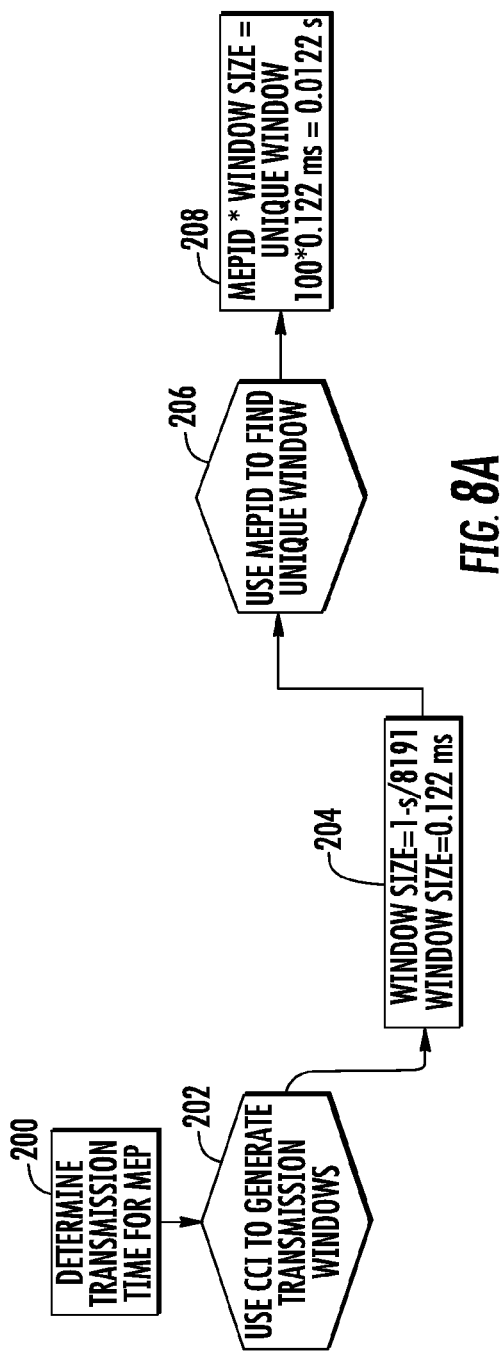
FIGS. 8A and 8B are flowcharts illustrating a first fixed example for determining the transmission window for a MEP in accordance with a non-limiting example.

As shown in FIG. 8A, a transmission time for the MEP is determined (block 200) and the CCI is used to generate the transmission windows (block 202). The window size as 1-s/8191 and the window size as 0.122 microseconds is illustrated (block 204). The MEPID is used to find the unique window (block 206). The unique window is determined as shown in this example with the MEPID and the window size as 100 times 0.122 microseconds for 0.0122 seconds (block 208).

Figure 8B:
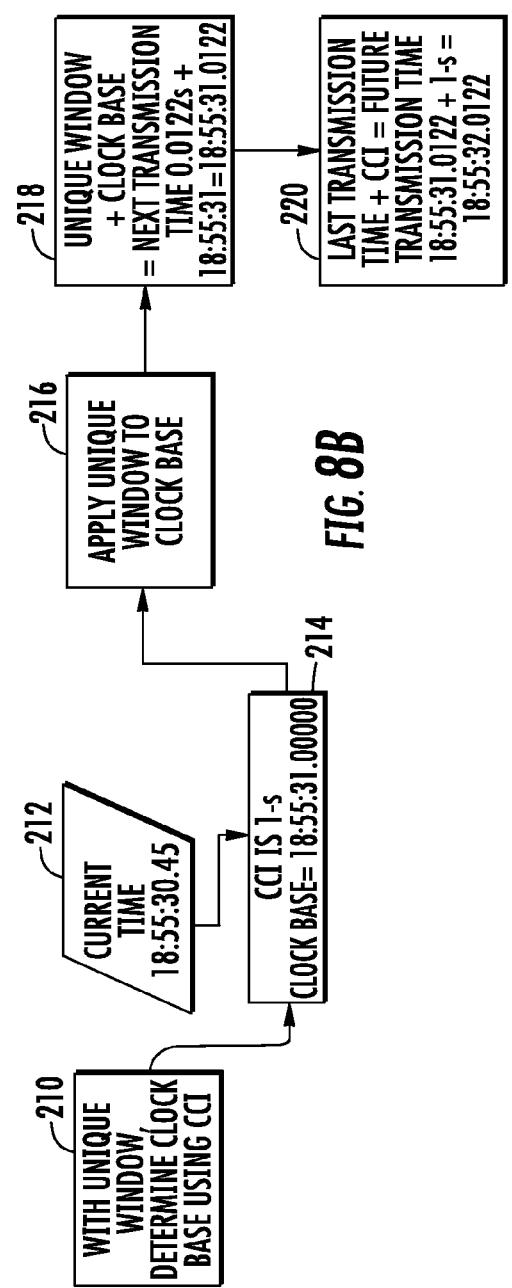

As shown in FIG. 8B, with the unique window, the clock base using the CCI is determined (block 210). In this example, the current time is used (block 212) with the CCI and the clock base (block 214). The unique window is applied to the clock base (block 216) and the unique window plus the clock base is used with the next transmission time with this example for 0.0122 seconds plus 18:55:31 (block 218). The last transmission time plus the CCI is used to obtain the future transmission time in this example as illustrated (block 220).

Fixed Example 2: The MEPID is 8000 and the CCM interval is 10-m. The MEP should transmit its CCM's at an offset of 586.009 seconds of every 10-m multiple. The flowchart illustrating this example is shown in the flowchart of FIGS. 9A and 9B.

Figure 9A:
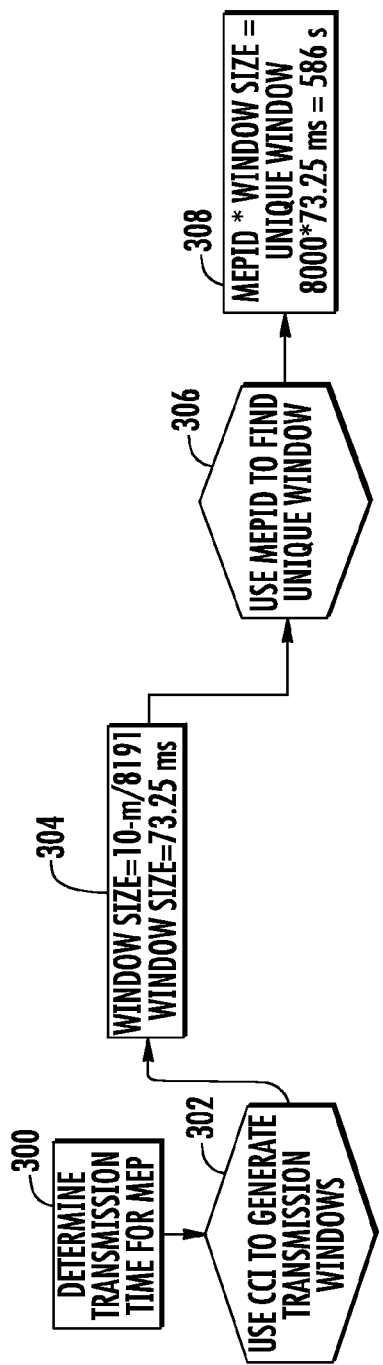
FIGS. 9A and 9B are flowcharts illustrating a second fixed example for determining the transmission window for a MEP in accordance with a non-limiting example.

As illustrated in FIG. 9A, the transmission time for the MEP is determined (block 300) and the CCI is used to generate transmission windows (block 302). The window size used as 10-m/8191 and 73.25 ms are used (block 304) and the MEPID is used to find a unique window (block 306). The unique window is determined by the MEPID and window size as 8000×73.25 ms to equal 586 seconds (block 308).

Figure 9B:
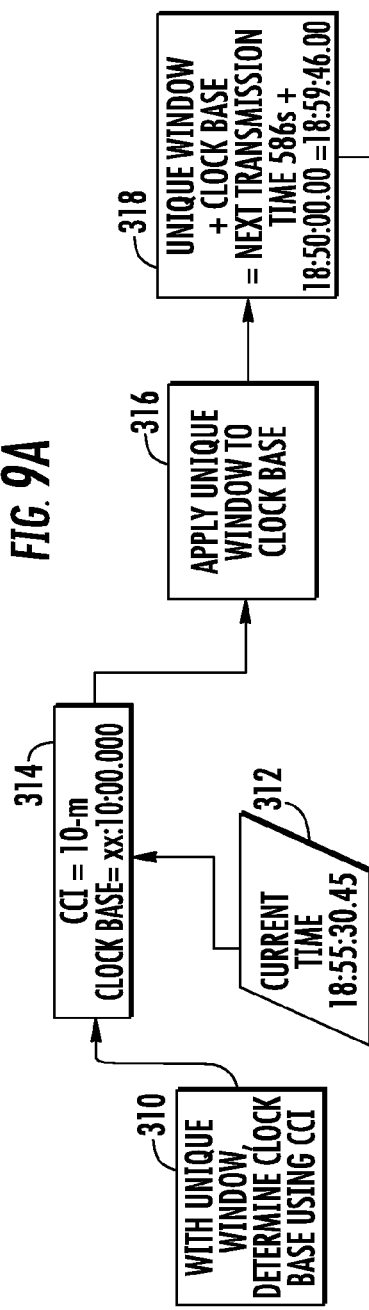

As shown in FIG. 9B, the unique window is used to determine the clock base using the CCI (block 310). The current time as 18:55:30.45 is used (block 312) and the CCI of 10-m for a clock base is used (block 314). A unique window is applied to the clock base (block 316). The unique window and the clock base correspond to the next transmission time as 18:59:46.00 (block 318). The last transmission time plus the CCI equals the future transmission time as 19:09:46.00 (block 320).

The fixed solution may not be ideal if the MEPID's used are sequential or are all close to each other in value. Using knowledge gained about the MA through receiving CCM's from peer MEP's, a given local MEP is aware of all other peer MEP's and their IDs. With this list of peer MEP IDs, a local MEP could calculate a more ideal time window for it to transmit a CCM.

The steps for this adaptive method are illustrated in the general flowcharts of FIGS. 10A and 10B and also listed below:

1) Local MEP determines how many MEP's are active in the MA; and

2) Take the CCI and divide it by the number of active MEP's in the MA to create the unique transmission windows.

$$\text{Window Size} = \frac{CCI}{\text{Total } MEPs \text{ in } MA}$$

3) Order the MEP's by ID in a list and determine its position in that list; and

4) Use its MEPID's position in the list of MEP's to determine which transmission window to use.

Unique Window=(position−1)*Window Size

5) Apply unique window to appropriate clock base.

Like the fixed solution, the transmission window is relative to the synchronized clock base which is either beginning of a second, a second that is a multiple of 10, a minute, or a minute that is a multiple of 10 depending on the CCI of the MA.

Figure 10A:
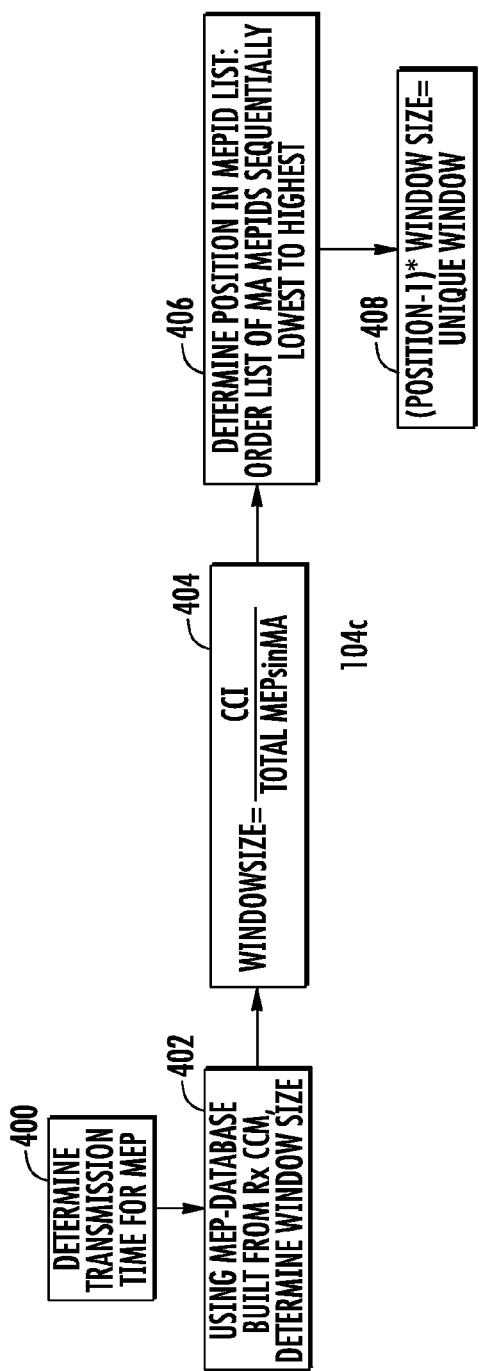
FIGS. 10A and 10B are flowcharts illustrating an adaptive technique for determining a transmission window for a MEP in accordance with a non-limiting example.

FIG. 10A illustrates a first sequence in which the transmission time for the MEP is determined (block 400). The MEP database is built from the received CCM and used to determine the window size equals the CCI over the total MEP's in the MA (block 404). The position is determined in the MEPID list and the list of MAMEPID's is ordered sequentially to the lowest to the highest (block 406). The unique window is determined as illustrated at block 408 by taking the position −1 times the window size.

Figure 10B:
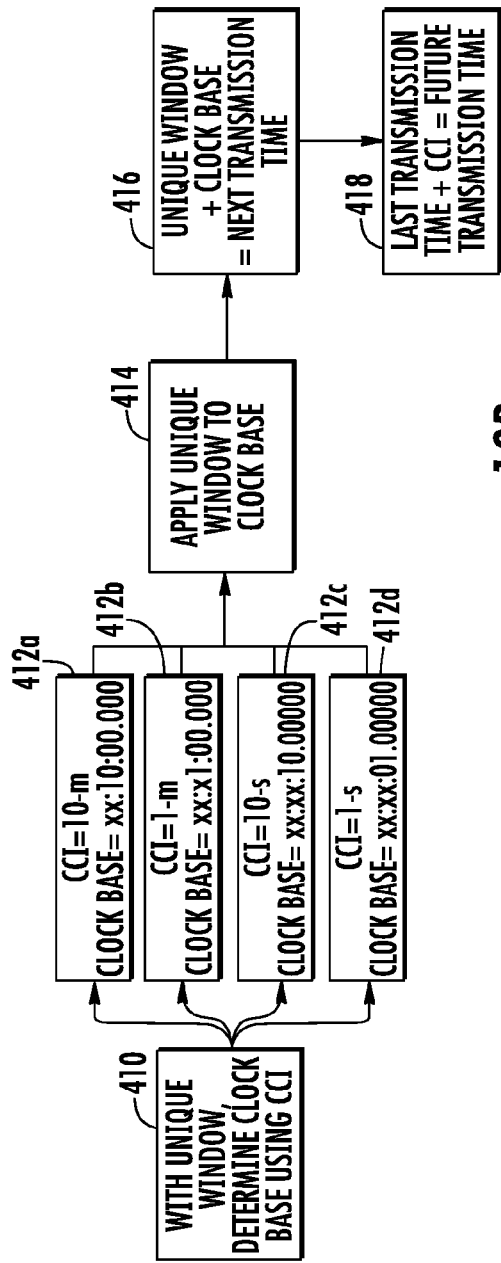

As shown in FIG. 10B with the unique window, the clock base is determined using the CCI (block 410). Four clock base factors are used as illustrated with the CCI and the clock base (blocks 412a through 412d) and the unique window applied to the clock base (block 414). The unique window plus the clock base equals the next transmission time (block 416). The last transmission time plus the CCI equals the future transmission time (block 418).

Adaptive Example 1: MEPID's in a MA are 1, 2, 3, and 4, and the CCI is 10-seconds. This example is illustrated in the flowcharts of FIGS. 11A and 11B.

Determine MEPID 103's transmission time:
1) Determine how many MEP's are active in MA—4.
2) Get the window size—10 s/4 is 2.5 s.
3) Determine the position of this local MEP—103 is 3$^{rd}$ in the list.
4) Unique offset is 5.0 s.
5) Apply this unique offset to the synchronized clock—MEPID 103 should transmit its CCMs at an offset of 5.0 s of every second value that is a multiple of 10.

Figures 11A, 11B:
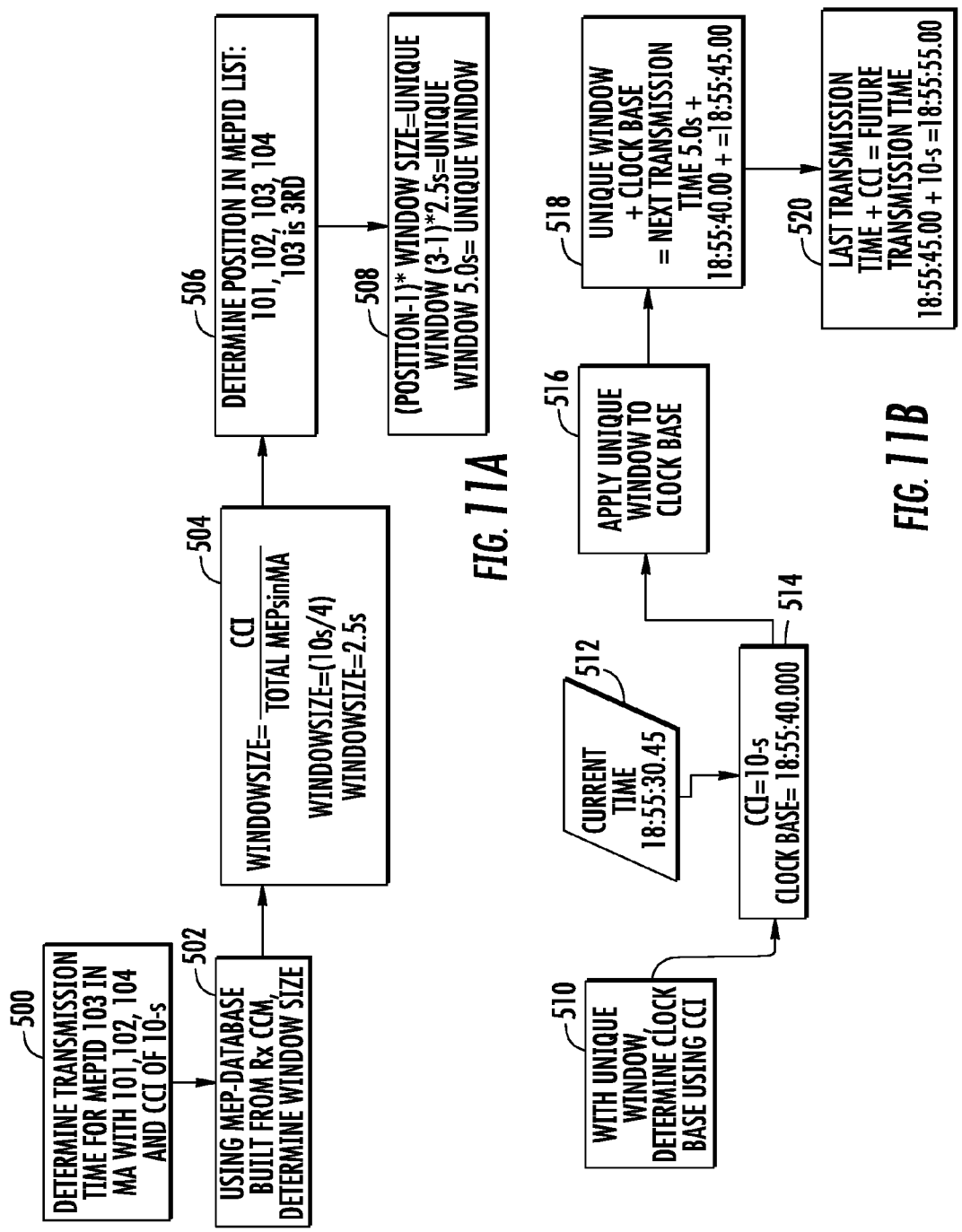
FIGS. 11A and 11B are flowcharts illustrating a first example for the adaptive technique in accordance with a non-limiting example.

As shown in FIG. 11A, the transmission time for the MEPID 103 in the MA is determined with 101, 102, 104 and CCI of 10-s (block 500). Using the MEP, the database is built from the received CCM and the window size determined (block 502). This window size is determined by using CCI over the total MEP's and the MA, which in this example is 10 s/4 and 2.5 seconds (block 504). The position in the MEPID list is determined (block 506) and the unique window determined in the example as shown at block 508.

As shown in FIG. 11B with the unique window, the clock base using the CCI is determined (block 510). The current time is shown as 18:55:30.45 (block 512). The CCI equals 10-s with the clock base of 18:55:40.000 (block 514). The unique window is applied to the clock base (block 516) and the next transmission time determined with the unique window and clock base in the example shown at block 518. The last transmission time plus the CCI equals the future transmission time (block 520).

Adaptive Example 2: If the MA is expanded when the new peer MEP 8000 joins the MA, these calculations are automatically re-run by each MEP in the MA to determine their unique transmission window. This process is shown in the flowcharts of FIGS. 12A and 12B.

Figures 12A, 12B:
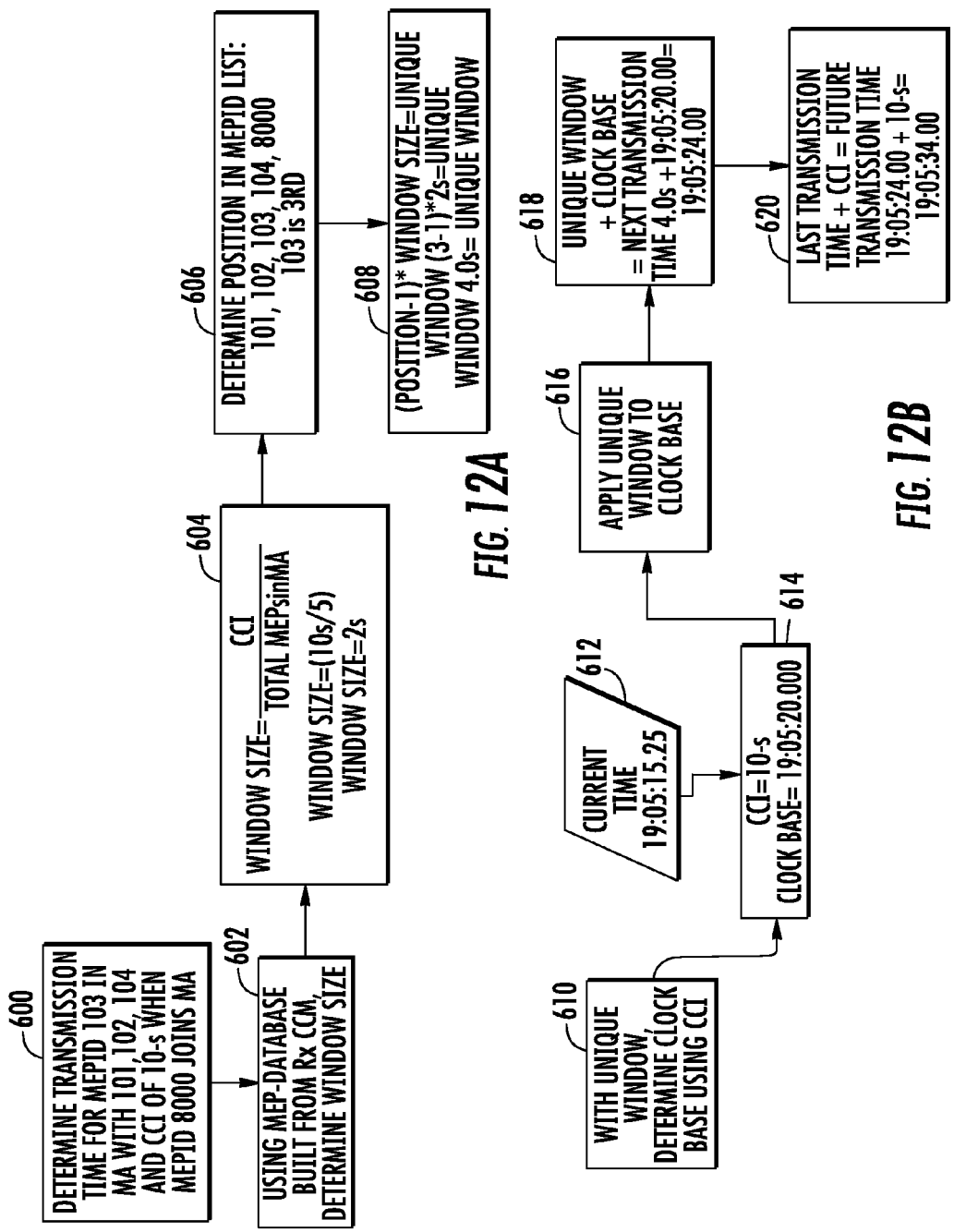
FIGS. 12A and 12B are flowcharts illustrating a second example of the adaptive technique in accordance with a non-limiting example.

As shown in FIG. 12A, the transmission time for MEPID 103 is determined in the MA with 101, 102, 104 and a CCI of 10-s when the MEPID 8000 joins the MA (block 600). Using the MEP, the database is built from the received CCM and the window size determined (block 602). The window size equals the CCI over the total MEP's in the MA (block 604). The position in the MEPID list is determined (block 606) and the unique window determined (block 608). Specific numerical examples are shown in FIG. 12A.

As shown in FIG. 12B with the unique window, the clock base using the CCI is determined (block 610). The current time is illustrated (block 612) and used with the CCI (block 614) to apply the unique window to the clock base (block 616). The unique window plus the clock base equals the next transmission time (block 618) and the last transmission time plus the CCI equals the future transmission time (block 620).

Adaptive Example 3: For the MA from the problem statement of 100 MEP's with a CCI of 10-seconds and where the MEPID's are sequential from 1-100, the adaptive solution guarantees that MEPID 1 will receive at most 10 CCM's in a given second. The Window Size will be 0.1 s and each MEP will have a unique transmission time within a 10-second window. Bursting is not possible and the CCM transmissions will be evenly distributed across the MA.

The system as described advantageously coordinates one-way multicast transmissions between devices such as Ethernet network switches at the protocol layer. Carrier Sense Multiple Access with Collision Detection (CSMA/CD) coordinates transmissions between devices sharing the same medium, but it is a layer 2 access method and not a protocol. It provides access to when the next frame can be sent based on the line being free/open. The system is advantageous over solutions that are concerned with evenly distributing transmissions and avoiding transmissions at line rates such as in some prior art techniques. The system is advantageous over systems that serialize transmissions that are common in applications that use either TCP or UDP, but that are a one-to-one communication where the transmission of the next message depends on the reception of one from a peer. Reception of a CCM does not prompt the peer MEP to generate a response and there is no acknowledgment. The system is also advantageous over token ring systems that allow for unique transmissions, but require a special frame to be passed from peer to peer.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which Is claimed is:

1. A communications system comprising:
a plurality of Maintenance Association End Points (MEP) arranged to form a Maintenance Association within the Maintenance Association have a clock synchronized with other respective clocks; and
each MEP having a unique transmission window in the Maintenance Association to transmit from the MEP a respective Connectivity Fault Management (CFM) packet as a multicast Continuity Check Message (CCM).

2. The communications system according to claim 1, wherein each clock is synchronized using a Network Time Protocol.

3. The communications system according to claim 1, wherein a respective MEP is configured to determine a transmission window by dividing the CFM packet interval by the maximum number of MEP/s in the Maintenance Association.

4. The communications system according to claim 1, wherein a local MEP is configured to have a unique transmission window at which it is the only MEP in the Maintenance Association transmitting a CCM.

5. The communications system according to claim 1, wherein a MEP is configured to use an identifier as an index to a list of transmission windows and use the transmission window as an offset against a synchronized timing source.

6. The communications system according to claim 5 wherein a MEP is configured to apply an offset against a base timing value of a clock.

7. The communications system according to claim 1, wherein a MEP is configured to determine a transmission window by ordering identifiers of the MEP's in a list and determining which transmission window to use based on the ordering of the MEP identifiers.

8. The communications system according to claim 7 wherein a MEP is configured to order the identifiers for MEP's in a list and determining which transmission window to use based on an MEP identifier in the list.

9. A method comprising:
synchronizing a clock of a network switch element configured as a Maintenance Association End Point (MEP) with clocks of other MEP's within a Maintenance Association;
assigning the MEP a unique transmission window in the Maintenance Association; and
transmitting from the MEP a Connectivity Fault Management (CFM) packet as a Continuity Check Message (CCM) within the unique transmission window.

10. The method according to claim 9, and further comprising synchronizing the clock using a Network Time Protocol.

11. The method according to claim 9, and further comprising determining the unique transmission window by dividing the CFM packet interval by the maximum number of MEP's in the Maintenance Association.

12. The method according to claim 9, and further comprising assigning a unique transmission window to the MEP at which it is the only MEP in the Maintenance Association transmitting a CCM.

13. The method according to claim 9, the MEP using an identifier as an index to a list of transmission windows and using the unique transmission window as an offset against a synchronized timing source.

14. The method according to claim 13, and further comprising applying an offset against a base timing value of a clock.

15. The method according to claim 9, and further comprising determining the unique transmission window by ordering identifiers of the MEP's in a list and determining which transmission window to use based on the ordering of the MEP identifiers.

16. The method according to claim 15, and further comprising ordering the identifiers for MEP's in a list and determining which transmission window to use based on an MEP identifier in the list.

17. A device, comprising:
a network switch element configured as a Maintenance Association End Point (MEP), the MEP operable to form a Maintenance Association with a plurality of other MEP's;
the MEP comprising a clock and operable to synchronize the clock with other respective clocks in the Maintenance Association and to determine a unique transmission window in the Maintenance Association to transmit from the MEP a Connectivity Fault Management (CFM) packet as a multicast Continuity Check Message (CCM).

18. The device of claim 17, wherein the clock is synchronized using a Network Time Protocol.

19. The device of claim 17, wherein the MEP is configured to determine the unique transmission window by dividing the CFM packet interval by the maximum number of MEP/s in the Maintenance Association.

20. The device of claim 17, wherein the MEP is configured to use an identifier as an index to a list of unique transmission windows and use the unique transmission window as an offset against a synchronized timing source.

21. The device of claim 20, wherein the MEP is configured to apply an offset against a base timing value of the clock.

22. The device of claim 17, wherein the MEP is configured to determine the unique transmission window by ordering identifiers of the MEP's in a list and to determine which unique transmission window to use based on the ordering of the MEP identifiers.

23. The device of claim 22, wherein the MEP is configured to order the identifiers for MEP's in a list and to determine which unique transmission window to use based on an MEP identifier in the list.

* * * * *